(12) United States Patent
Hara

(10) Patent No.: US 11,485,851 B2
(45) Date of Patent: Nov. 1, 2022

(54) LIQUID CRYSTAL POLYESTER RESIN COMPOSITION AND MOLDED BODY

(71) Applicant: SUMITOMO CHEMICAL COMPANY, LIMITED, Tokyo (JP)

(72) Inventor: Tomoyuki Hara, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 141 days.

(21) Appl. No.: 16/765,115

(22) PCT Filed: Nov. 21, 2018

(86) PCT No.: PCT/JP2018/042981
§ 371 (c)(1),
(2) Date: May 18, 2020

(87) PCT Pub. No.: WO2019/103036
PCT Pub. Date: May 31, 2019

(65) Prior Publication Data
US 2020/0347224 A1    Nov. 5, 2020

(30) Foreign Application Priority Data

Nov. 27, 2017 (JP) .............................. JP2017-227144

(51) Int. Cl.
*C08L 67/04* (2006.01)
*C08K 3/40* (2006.01)
*C08K 7/14* (2006.01)

(52) U.S. Cl.
CPC ............... *C08L 67/04* (2013.01); *C08K 3/40* (2013.01); *C08K 7/14* (2013.01); *C08K 2201/004* (2013.01); *C08L 2205/025* (2013.01); *C08L 2205/12* (2013.01)

(58) Field of Classification Search
CPC .................................. C08K 3/40; C08K 7/14
See application file for complete search history.

(56) References Cited

U.S. PATENT DOCUMENTS

| | | |
|---|---|---|
| 5,141,985 A | 8/1992 | Asai et al. |
| 5,308,913 A | 5/1994 | Asai et al. |
| 5,492,946 A | 2/1996 | Huspeni et al. |
| 5,840,798 A | 11/1998 | Vollenberg et al. |
| 6,063,848 A | 5/2000 | Murakami et al. |
| 6,702,955 B1 | 3/2004 | Murakami et al. |
| 2002/0017631 A1 | 2/2002 | Maeda et al. |
| 2006/0113391 A1 | 6/2006 | Fukatsu |
| 2008/0203358 A1 | 8/2008 | Mizumoto et al. |
| 2009/0212684 A1 | 8/2009 | Saito et al. |
| 2010/0065777 A1 | 3/2010 | Murouchi et al. |
| 2012/0217678 A1 | 8/2012 | Komatsu et al. |
| 2012/0235092 A1 | 9/2012 | Sekimura et al. |
| 2013/0002714 A1 | 1/2013 | Saito |
| 2013/0015401 A1 | 1/2013 | Matsubara et al. |
| 2013/0082206 A1 | 4/2013 | Fukuhara et al. |
| 2015/0073068 A1 | 3/2015 | Komatsu et al. |
| 2018/0346641 A1 | 12/2018 | Hegi |
| 2018/0355150 A1 | 12/2018 | Kim |

FOREIGN PATENT DOCUMENTS

| | | |
|---|---|---|
| JP | 02-077443 A | 3/1990 |
| JP | 03-265650 A | 11/1991 |
| JP | 04-248868 A | 9/1992 |
| JP | 06-240115 A | 8/1994 |
| JP | 07-304935 A | 11/1995 |
| JP | 09-176377 A | 7/1997 |
| JP | 2000-026743 A | 1/2000 |
| JP | 2000-178443 A | 6/2000 |
| JP | 2000-273320 A | 10/2000 |
| JP | 2001-288342 A | 10/2001 |
| JP | 2006-152120 A | 6/2006 |
| JP | 2008-239950 A | 10/2008 |
| JP | 2009-191088 A | 8/2009 |
| JP | 2009-231269 A | 10/2009 |
| JP | 2012-056250 A | 3/2012 |
| JP | 2012-193270 A | 10/2012 |
| JP | 2012-193343 A | 10/2012 |
| JP | 2012-206296 A | 10/2012 |
| JP | 2013-012063 A | 1/2013 |
| JP | 2013-072070 A | 4/2013 |
| JP | 2013-194165 A | 9/2013 |
| JP | 2015-040249 A | 3/2015 |
| JP | 2015-183159 A | 10/2015 |

(Continued)

OTHER PUBLICATIONS

International Search Report issued in corresponding to International Patent Application No. PCT/JP2018/042981, dated Feb. 12, 2019, with English translation.
Japanese Notice of Reasons for Refusal issued in corresponding Japanese Patent Application No. 2017-227144, dated Mar. 6, 2018, with English translation.
Japanese Decision of Rejection issued in corresponding Japanese Patent Application No. 2017-227144, dated Aug. 28, 2018, with English translation.
Taiwanese Office Action issued in corresponding Taiwanese Patent Application No. 107141870, dated Dec. 28, 2021, with English translation.
Duoren Wang, "Green Nano Chemicals," Science and Technology Literature Press, Jul. 2017, pp. 374-375.
Chinese Office Action issued in corresponding Chinese Patent Application No. 201880073486.8, dated Nov. 24, 2021, with English translation.

(Continued)

*Primary Examiner* — Arrie L Reuther
(74) *Attorney, Agent, or Firm* — McDermott Will & Emery LLP

(57) ABSTRACT

A liquid crystal polyester resin composition containing 100 parts by mass of a liquid crystal polyester resin; and at least 5 parts by mass and at most 100 parts by mass of glass components; wherein the glass components contain glass fibers having a length of more than 50 μm and glass fine powders having a length of at least 4 μm and at most 50 μm; the number-average fiber length of the glass fibers is at least 200 μm and at most 400 μm; and the content of the fine powders is at least 20% and at most 95% relative to a total number of the glass components.

9 Claims, No Drawings

(56) References Cited

FOREIGN PATENT DOCUMENTS

| | | |
|---|---|---|
| JP | 2017-052876 A | 3/2017 |
| JP | 2017-057258 A | 3/2017 |
| JP | 6439027 B1 | 12/2018 |
| WO | 2012/090410 A1 | 7/2012 |
| WO | 2014/050370 A1 | 4/2014 |
| WO | 2017/051883 A1 | 3/2017 |
| WO | 2017/099115 A1 | 6/2017 |

OTHER PUBLICATIONS

International Search Report issued in co-pending U.S. Appl. No. 16/764,621 from corresponding International Patent Application No. PCT/JP2018/042974, dated Feb. 26, 2019, with English translation.

Japanese Office Action issued in co-pending U.S. Appl. No. 16/764,621 from corresponding Japanese Patent Application No. 2017-227143, dated Mar. 6, 2018, with English translation.

Taiwanese Office Action issued in co-pending U.S. Appl. No. 16/764,621 from corresponding Taiwanese Patent Application No. 107141874, dated Nov. 10, 2021, with English translation.

Chinese Office Action issued in co-pending U.S. Appl. No. 16/764,621 from corresponding Chinese Patent Application No. 201880072727.7, dated Dec. 1, 2021, with English translation.

U.S. PTO Non-Final Office Action issued in co-pending U.S. Appl. No. 16/764,621, dated Mar. 23, 2022.

Associated with co-pending U.S. Appl. No. 16/764,621, filed May 15, 2020.

LIQUID CRYSTAL POLYESTER RESIN COMPOSITION AND MOLDED BODY

CROSS REFERENCE TO RELATED APPLICATIONS

This application is the U.S. National Phase under 35 U.S.C. § 371 of International Application No. PCT/JP2018/042981, filed on Nov. 21, 2018, which claims the benefit of Japanese Application No. 2017-227144, filed on Nov. 27, 2017, the entire contents of each are hereby incorporated by reference.

TECHNICAL FIELD

The present invention relates to a liquid crystal polyester resin composition, and a molded body.

Priority is claimed on Japanese Patent Application No. 2017-227144, filed Nov. 27, 2017, the disclosure of which is incorporated herein by reference.

BACKGROUND ART

Liquid crystal polyester resins have very excellent melt flowability, and depending on their structure, may have thermal deformation resistance to 300° C. or higher. Taking advantage of these properties, liquid crystal polyester resins are used in molded bodies for uses such as electronic components, as well as office appliances, audiovisual components, heat-resistant tableware and the like.

In the electronic component field, advances are being made in miniaturization and precision, and molded bodies obtained by using liquid crystal polyester resins are becoming extremely thin. The thinning of molded bodies is causing problems such as decreased strength in the molded bodies, the controlling of anisotropy in the liquid crystal polyester resins and the like. In order to solve these problems, liquid crystal polyester resin compositions in which fibrous fillers are blended with liquid crystal polyester resins are being used (for example, Patent Documents 1 to 3).

CITATION LIST

Patent Documents

[Patent Document 1] JP H6-240115 A
[Patent Document 2] JP 2009-191088 A
[Patent Document 3] WO 2012/090410

SUMMARY OF THE INVENTION

Problems to be Solved by the Invention

For the purposes of protecting the environment and cutting costs by reducing waste, recycling methods that involve grinding molded bodies such as runners and sprues that are generated during injection molding, and reusing the ground molded bodies as raw materials in the production of molded bodies, or mixing some of the ground molded bodies with raw materials that have not been used in the production of molded bodies, and reusing the mixtures as raw materials in the production of molded bodies, have started to be considered.

Hereinafter, in the present description, the grinding of molded bodies and their regeneration as raw materials for use in the production of molded bodies will be referred to as "regrinding" and the resulting ground matter will be referred to as "reground material". In contrast therewith, raw materials that have not been used in the production of molded bodies will be referred to as "virgin material".

Reground material is known to have physical properties that are generally inferior in comparison to those of virgin material. Reground material has a more extensive thermal history than virgin material does. For this reason, it is thought that degradation of the resin due to heat lowers the mechanical strength of molded bodies formed by using reground material. Additionally, reground material is produced by grinding. For this reason, the physical destruction of fillers is thought to lower the mechanical strength of molded bodies formed by using reground material.

Thus, in order to effectively utilize reground material, there has been a demand for a liquid crystal polyester resin composition (virgin material) wherein the mechanical strength of molded bodies using reground material does not easily become lower than the mechanical strength of molded bodies using virgin material and can be kept within a range allowing use in molded bodies.

The resin compositions described in Patent Documents 1 to 3 do not necessarily have high mechanical strength retention rates when reground.

In the present description, "mechanical strength" refers to the tensile strength and the Izod impact strength. Additionally, the "mechanical strength retention rate" is a value calculated as the physical value of the mechanical strength of a molded body formed by using reground material relative to the physical value of the mechanical strength of a molded body formed by using virgin material.

The present invention was made in consideration of these circumstances, and has the purpose of providing a liquid crystal polyester resin composition and a molded body having a high mechanical strength retention rate when reground.

Means to Solve the Problems

In order to solve the above-mentioned problem, an embodiment of the present invention provides a liquid crystal polyester resin composition comprising 100 parts by mass of a liquid crystal polyester resin; and at least 5 parts by mass and at most 100 parts by mass of glass components; wherein the glass components contain glass fibers having a length of more than 50 μm and glass fine powders having a length of at least 4 μm and at most 50 μm; the number-average fiber length of the glass fibers is at least 200 μm and at most 400 μm; and the content of the fine powders is at least 20% and at most 95% relative to a total number of the glass components.

In one embodiment of the present invention, the fine powders may be composed of glass first fine powders having a length of at least 4 μm and at most 40 μm, and second fine powders having a length of more than 40 μm and at most 50 μm; and at least 40% and at most 90% of the first fine powders may be contained relative to the total number of the glass components.

In one embodiment of the present invention, the content of the fine powders may be at least 70% and at most 90% relative to the total number of the glass components.

In one embodiment of the present invention, the fine powders may have a diameter of at least 9 μm and at most 12 μm, and the fine powders may have an aspect ratio of at least 0.3 and at most 5.6.

In one embodiment of the present invention, the liquid crystal polyester resin may contain repeat units represented by formulas (1) to (3) below:

$$-O-Ar^1-CO- \quad (1)$$

$$-CO-Ar^2-CO- \quad (2)$$

$$-X-Ar^3-Y- \quad (3)$$

wherein $Ar^1$ represents a phenylene group, a naphthylene group or a biphenylylene group;

$Ar^2$ and $Ar^3$ represent, independently of each other, a phenylene group, a naphthylene group, a biphenylylene group or a group represented by formula (4) below;

X and Y represent, independently of each other, an oxygen atom or an imino group (—NH—); and at least one hydrogen atom in the group represented by $Ar^1$, $Ar^2$ or $Ar^3$ may, independently of each other, be substituted by a halogen atom, an alkyl group having 1 to 10 carbon atoms or an aryl group having 6 to 20 carbon atoms;

$$-Ar^4-Z-Ar^5- \quad (4)$$

wherein $Ar^4$ and $Ar^5$ represent, independently of each other, a phenylene group or a naphthylene group; Z represents an oxygen atom, a sulfur atom, a carbonyl group, a sulfonyl group or an alkylidene group having 1 to 10 carbon atoms; and at least one hydrogen atom in the group represented by $Ar^4$ or $Ar^5$ may, independently of each other, be substituted by a halogen atom, an alkyl group having 1 to 10 carbon atoms or an aryl group having 6 to 20 carbon atoms.

In one embodiment of the present invention, $Ar^1$ may be a 1,4-phenylene group, $Ar^2$ may be a 1,4-phenylene group and a 1,3-phenylene group, $Ar^3$ may be a biphenylylene group, and X and Y may each be oxygen atoms.

In one embodiment of the present invention, a molar ratio (3)/(1) between repeating units represented by formula (1) and repeating units represented by formula (3) may be at least 0.2 and at most 1.0; and a molar ratio (2)/(3) between repeating units represented by formula (3) and repeating units represented by formula (2) may be at least 0.9 and at most 1.1.

In one embodiment of the present invention, a molar ratio y/x between repeating units represented by formula (2) may be greater than 0 and at most 1, wherein x represents a molar content of repeating units in which $Ar^2$ is a 1,4-phenylene group; and y represents a molar content of repeating units in which $Ar^2$ is a 1,3-phenylene group.

In one embodiment of the present invention, the liquid crystal polyester resin may contain a first liquid crystal polyester resin and a second liquid crystal polyester resin, and $\alpha/\beta$ may be at least 0.1 and at most 0.6, wherein $\alpha$ represents the molar ratio y/x in the first liquid crystal polyester resin; and $\beta$ represents the molar ratio y/x in the second liquid crystal polyester resin.

An embodiment of the present invention provides a molded body having, as the forming material thereof, a liquid crystal polyester resin composition as mentioned above.

In other words, the present invention includes the embodiments below.

[1] A liquid crystal polyester resin composition comprising:
100 parts by mass of a liquid crystal polyester resin; and
at least 5 parts by mass and at most 100 parts by mass of glass components; wherein
the glass components contain glass fibers having a length of more than 50 μm and glass fine powders having a length of at least 4 μm and at most 50 μm;

the number-average fiber length of the glass fibers is at least 200 μm and at most 400 μm; and
the content of the fine powders is at least 20% and at most 95% relative to a total number of the glass components.

[2] The liquid crystal polyester resin composition according to [1], wherein:
the fine powders are composed of first fine powders having a length of at least 4 μm and at most 40 μm, and second fine powders having a length of more than 40 μm and at most 50 μm; and
the content of the first fine powders is at least 40% and less than 90% relative to the total number of the glass components.

[3] The liquid crystal polyester resin composition according to [1] or [2], wherein the content of the fine powders is at least 70% and at most 90% relative to the total number of the glass components.

[4] The liquid crystal polyester resin composition according to any one of [1] to [3], wherein the liquid crystal polyester resin contains repeating units represented by formulas (1) to (3) below:

$$-O-Ar^1-CO- \quad (1)$$

$$-CO-Ar^2-CO- \quad (2)$$

$$-X-Ar^3-Y- \quad (3)$$

wherein $Ar^1$ represents a phenylene group, a naphthylene group or a biphenylylene group;

$Ar^2$ and $Ar^3$ represent, independently of each other, a phenylene group, a naphthylene group, a biphenylylene group or a group represented by formula (4) below;

X and Y represent, independently of each other, an oxygen atom or an imino group (—NH—); and at least one hydrogen atom in the group represented by $Ar^1$, $Ar^2$ or $Ar^3$ may, each independently, be substituted by a halogen atom, an alkyl group having 1 to 10 carbon atoms or an aryl group having 6 to 20 carbon atoms;

$$-Ar^4-Z-Ar^5- \quad (4)$$

wherein $Ar^4$ and $Ar^5$ represent, independently of each other, a phenylene group or a naphthylene group; Z represents an oxygen atom, a sulfur atom, a carbonyl group, a sulfonyl group or an alkylidene group having 1 to 10 carbon atoms; and at least one hydrogen atom in the group represented by $Ar^4$ or $Ar^5$ may, each independently, be substituted by a halogen atom, an alkyl group having 1 to 10 carbon atoms or an aryl group having 6 to 20 carbon atoms.

[5] The liquid crystal polyester resin composition according to [4], wherein $Ar^1$ is a 1,4-phenylene group, $Ar^2$ is a 1,4-phenylene group and a 1,3-phenylene group, $Ar^3$ is a biphenylylene group, and X and Y are each oxygen atoms.

[6] The liquid crystal polyester resin composition according to [4] or [5], wherein:
a molar ratio (3)/(1) between repeating units represented by formula (1) and repeating units represented by formula (3) is at least 0.2 and at most 1.0; and
a molar ratio (2)/(3) between repeating units represented by formula (3) and repeating units represented by formula (2) is at least 0.9 and at most 1.1.

[7] The liquid crystal polyester resin composition according to any one of [4] to [6], wherein a molar ratio y/x between repeating units represented by formula (2) is greater than 0 and at most 1, wherein:

x represents a molar content of repeating units in which $Ar^2$ is a 1,4-phenylene group; and y represents a molar content of repeating units in which $Ar^2$ is a 1,3-phenylene group.

[8] The liquid crystal polyester resin composition according to [7], wherein the liquid crystal polyester resin contains a first liquid crystal polyester resin and a second liquid crystal polyester resin, and α/β is at least 0.1 and at most 0.6, wherein:

α represents the molar ratio y/x in the first liquid crystal polyester resin; and β represents the molar ratio y'/x' in the second liquid crystal polyester resin.

[9] A molded body formed from the liquid crystal polyester resin composition according to any one of [1] to [8].

Effects of the Invention

According to an embodiment of the present invention, a liquid crystal polyester resin composition having a high mechanical strength retention rate when reground, and a molded body, are provided.

EMBODIMENTS FOR CARRYING OUT THE INVENTION

Liquid Crystal Polyester Resin Composition

The liquid crystal polyester resin composition in the present embodiment contains a liquid crystal polyester resin and glass components.

Liquid Crystal Polyester Resin

Typical examples of liquid crystal polyester resins according to the present embodiment include polymers obtained by condensation polymerization (polycondensation) of an aromatic hydroxycarboxylic acid, an aromatic dicarboxylic acid, and at least one compound selected from the group consisting of an aromatic diol, an aromatic hydroxylamine and an aromatic diamine; polymers obtained by polymerizing multiple types of aromatic hydroxycarboxylic acids; polymers obtained by polymerizing an aromatic dicarboxylic acid and at least one compound selected from the group consisting of an aromatic diol, an aromatic hydroxylamine and an aromatic diamine; and polymers obtained by polymerizing a polyester such as polyethylene terephthalate and an aromatic hydroxycarboxylic acid.

Among the above, polymers obtained by condensation polymerization (polycondensation) of an aromatic hydroxycarboxylic acid, an aromatic dicarboxylic acid, and at least one compound selected from the group consisting of an aromatic diol, an aromatic hydroxylamine and an aromatic diamine are preferred.

In this case, the aromatic hydroxycarboxylic acid, the aromatic dicarboxylic acid, the aromatic diol, the aromatic hydroxylamine and the aromatic diamine may, independently of each other, be replaced partially or entirely with a polymerizable ester-forming derivative thereof.

Examples of polymerizable derivatives of compounds having a carboxy group, such as an aromatic hydroxycarboxylic acid and an aromatic dicarboxylic acid, include esters, acid halides and acid anhydrides. Examples of the above-mentioned esters include compounds obtained by converting a carboxy group to an alkoxycarbonyl group or an aryloxycarbonyl group. Examples of the above-mentioned acid halides include compounds obtained by converting a carboxy group to a haloformyl group. Examples of the above-mentioned acid anhydrides include compounds obtained by converting a carboxy group to an acyloxycarbonyl group.

Examples of polymerizable derivatives of compounds having an amino group, such as an aromatic hydroxylamine and an aromatic diamine, include compounds obtained by acylating an amino group and converting it to an acylamino group (i.e., amino group acylates).

Among the indicated examples of polymerizable derivatives, the raw material monomer in the liquid crystal polyester resin is preferably an acylate obtained by acylating an aromatic hydroxycarboxylic acid and an aromatic diol.

The liquid crystal polyester resin according to the present embodiment preferably has repeating units represented by formula (1) below (hereinafter sometimes referred to as "repeating units (1)"). Additionally, the liquid crystal polyester resin more preferably has the repeating units (1), repeating units represented by formula (2) below (hereinafter sometimes referred to as "repeating units (2)") and repeating units represented by formula (3) below (hereinafter sometimes referred to as "repeating units (3)").

—O—Ar¹—CO— (1)

—CO—Ar²—CO— (2)

—X—Ar³—Y— (3)

In formulas (1) to (3), $Ar^1$ represents a phenylene group, a naphthylene group or a biphenylylene group.

$Ar^2$ and $Ar^3$ represent, independently of each other, a phenylene group, a naphthylene group, a biphenylylene group or a group represented by formula (4) below. X and Y represent, independently of each other, an oxygen atom or an imino group (—NH—).

At least one hydrogen atom in the group represented by $Ar^1$, $Ar^2$ or $Ar^3$ may, each independently, be substituted by a halogen atom, an alkyl group having 1 to 10 carbon atoms or an aryl group having 6 to 20 carbon atoms.

—Ar⁴—Z—Ar⁵— (4)

In formula (4), $Ar^4$ and $Ar^5$ represent, independently of each other, a phenylene group or a naphthylene group. Z represents an oxygen atom, a sulfur atom, a carbonyl group, a sulfonyl group or an alkylidene group having 1 to 10 carbon atoms.

At least one hydrogen atom in the group represented by $Ar^4$ or $Ar^5$ may, each independently, be substituted by a halogen atom, an alkyl group having 1 to 10 carbon atoms or an aryl group having 6 to 20 carbon atoms.

Examples of halogen atoms that can be substituted for a hydrogen atom include a fluorine atom, a chlorine atom, a bromine atom and an iodine atom.

Examples of alkyl groups having 1 to 10 carbon atoms that can be substituted for a hydrogen atom include a methyl group, an ethyl group, a 1-propyl group, an isopropyl group, a 1-butyl group, an isobutyl group, a sec-butyl group, a tert-butyl group, a 1-hexyl group, a 2-ethylhexyl group, a 1-octyl group and a 1-decyl group.

Examples of aryl groups having 6 to 20 carbon atoms that can be substituted for a hydrogen atom include a monocyclic aromatic group such as a phenyl group, an ortho-tolyl group, a meta-tolyl group, a para-tolyl group or the like, or a condensed-ring aromatic group such as a 1-naphthyl group or a 2-naphthyl group.

When at least one hydrogen atom in the group represented by $Ar^1$, $Ar^2$, $Ar^3$, $Ar^4$ or $Ar^5$ is substituted with the above-mentioned substituent groups, the number of substituent groups is preferably one or two, independently of each other, for every group represented by $Ar^1$, $Ar^2$, $Ar^3$, $Ar^4$ or $Ar^5$. Additionally, it is more preferable for there to be one substituent group in every group represented by $Ar^1$, $Ar^2$, $Ar^3$, $Ar^4$ or $Ar^5$.

Examples of the alkylidene groups having 1 to 10 carbon atoms include a methylene group, an ethylidene group, an isopropylidene group, a 1-butylidene group and a 2-ethylhexylidene group.

The repeating units (1) are repeating units derived from a prescribed aromatic hydroxycarboxylic acid.

In the present description, "derived" means that the chemical structure is changed for the polymerization of the raw material monomers, while no other structural changes occur.

Examples of aromatic hydroxycarboxylic acids include 4-hydroxybenzoic acid, meta-hydroxybenzoic acid, 2-hydroxy-6-naphthoic acid, 2-hydroxy-3-naphthoic acid, 1-hydroxy-5-naphthoic acid, 4-hydroxy-4'-carboxydiphenyl ether, and aromatic hydroxycarboxylic acids in which some of the hydrogen atoms in the aromatic rings in these aromatic hydroxycarboxylic acids are substituted with substituent groups selected from the group consisting of alkyl groups, aryl groups and halogen atoms.

In the production of the liquid crystal polyester resin, it is possible to use a single aromatic hydroxycarboxylic acid or to use a combination of two or more types.

The repeating units (1) are preferably units in which $Ar^1$ is a 1,4-phenylene group (for example, repeating units derived from 4-hydroxybenzoic acid) and units in which $Ar^1$ is a 2,6-naphthylene group (for example, repeating units derived from 6-hydroxy-2-naphthoic acid), among which units in which $Ar^1$ is a 1,4-phenylene group are more preferable.

The repeating units (2) are repeating units derived from a prescribed aromatic dicarboxylic acid.

Examples of the aromatic dicarboxylic acid include terephthalic acid, isophthalic acid, biphenyl-4,4'-dicarboxylic acid, 2,6-naphthalene dicarboxylic acid, diphenyl ether-4,4'-dicarboxyclic acid, diphenyl thioether-4,4'-dicarboxyclic acid, and aromatic dicarboxylic acids in which some of the hydrogen atoms in the aromatic rings in these aromatic dicarboxylic acids are substituted with substituent groups selected from the group consisting of alkyl groups, aryl groups and halogen atoms.

In the production of the liquid crystal polyester resin, it is possible to use a single aromatic dicarboxylic acid or to use a combination of two or more types.

The repeating units (2) are preferably units in which $Ar^2$ is a 1,4-phenylene group (for example, repeating units derived from terephthalic acid), units in which $Ar^2$ is a 1,3-phenylene group (for example, repeating units derived from isophthalic acid), units in which $Ar^2$ is a 2,6-naphthylene group (for example, repeating units derived from 2,6-naphthalene dicarboxylic acid), and units in which $Ar^2$ is a diphenyl ether-4,4'-diyl group (for example, repeating units derived from diphenyl ether-4,4'-dicarboxylic acid), among which units in which $Ar^2$ is a 1,4-phenylene group and units in which $Ar^2$ is a 1,3-phenylene group are more preferable.

The repeating units (3) are repeating units derived from a prescribed aromatic diol, aromatic hydroxylamine or aromatic diamine.

Examples of aromatic diols, aromatic hydroxylamines or aromatic diamines include 4,4'-dihydroxybiphenyl, hydroquinone, resorcinol, 4,4'-dihydroxydiphenyl ketone, 4,4'-dihydroxydiphenyl ether, bis(4-hydroxyphenyl)methane, 1,2-bis(4-hydroxyphenyl)ethane, 4,4'-dihydroxydiphenyl sulfone, 4,4'-dihydroxydiphenyl thioether, 2,6-dihydroxynaphthalene, 1,5-dihydroxynaphthalene, 4-aminophenol, 1,4-phenylenediamine, 4-amino-4'-hydroxybiphenyl and 4,4'-diaminobiphenyl.

In the production of the liquid crystal polyester resin, it is possible to use a single aromatic diol, aromatic hydroxylamine or aromatic diamine, or to use a combination of two or more types.

The repeating units (3) are preferably units in which $Ar^3$ is a 1,4-phenylene group (for example, repeating units derived from hydroquinone, 4-aminophenol or 1,4-phenylenediamine), and units in which $Ar^3$ is a 4,4'-biphenylylene group (for example, repeating units derived from 4,4'-dihydroxybiphenyl, 4-amino-4'-hydroxybiphenyl or 4,4'-diaminobiphenyl), among which units in which $Ar^3$ is a 4,4'-biphenylylene group are more preferable.

The repeating units (3) are preferably units in which X and Y are both oxygen atoms.

When the molded body obtained from the liquid crystal polyester resin composition in the present embodiment is required to have particularly good heat resistance and thermal stability, the repeating units (1) to (3) preferably have fewer substituent groups. Additionally, when the molded body obtained from the liquid crystal polyester resin composition in the present embodiment is required to have particularly good heat resistance and thermal stability, there are preferably no substituent groups (for example, alkyl groups) that are susceptible to heat.

In the present embodiment, the heat resistance of the molded body refers to the property in which the resin that is the material forming the molded body does not easily soften in high-temperature environments. In the present embodiment, the heat resistance of the molded body can be made clearer by measuring the load deflection temperature of the resin. The load deflection temperature in the present embodiment is measured with a load of 1.82 MPA in accordance with ASTM D648. The higher the load deflection temperature of a resin measured in this way, the higher the heat resistance of the molded body can be considered to be.

Additionally, in the present embodiment, the thermal stability of the molded body refers to the property in which the resin does not tend to decompose or degrade when the molded body is held at the temperature at which the resin is molded (i.e., the melting temperature).

Next, regarding liquid crystal polyester resins that are particularly preferable for utilization in the present embodiment, combinations of repeating units thereof will be explained in detail based on the examples of repeating units mentioned above.

Specific examples of liquid crystal polyester resins that are preferable in the present embodiment include, for example, resins comprising repeating units derived from the monomers mentioned below.

(a) 4-hydroxybenzoic acid/2-hydroxy-6-naphthoic acid copolymer (b) 4-hydroxybenzoic acid/terephthalic acid/4,4'-dihydroxybi phenyl copolymer (c) 4-hydroxybenzoic acid/terephthalic acid/isophthalic acid/4,4'-dihydroxybiphenyl copolymer (d) 4-hydroxybenzoic acid/terephthalic acid/isophthalic acid/4,4'-dihydroxybiphenyl/hydroquinone copolymer (e) 4-hydroxybenzoic acid/terephthalic acid/hydroquinone copolymer (f) 2-hydroxy-6-naphthoic acid/terephthalic acid/hydroquinone copolymer (g) 4-hydroxybenzoic acid/2-hydroxy-6-naphthoic acid/terephthalic acid/4,4'-dihydroxybiphenyl copolymer
(h) 2-hydroxy-6-naphthoic acid/terephthalic acid/4,4'-dihydroxybiphenyl copolymer
(i) 4-hydroxybenzoic acid/2-hydroxy-6-naphthoic acid/terephthalic acid/hydroquinone copolymer
(j) 4-hydroxybenzoic acid/2-hydroxy-6-naphthoic acid/terephthalic acid/hydroquinone/4,4'-dihydroxybiphenyl copolymer
(k) 4-hydroxybenzoic acid/2,6-naphthalene dicarboxylic acid/4,4'-dihydroxybiphenyl copolymer
(l) 4-hydroxybenzoic acid/terephthalic acid/2,6-naphthalene dicarboxylic acid/hydroquinone copolymer
(m) 4-hydroxybenzoic acid/2,6-naphthalene dicarboxylic acid/hydroquinone copolymer
(n) 4-hydroxybenzoic acid/2-hydroxy-6-naphthoic acid/2,6-naphthalene dicarboxylic acid/hydroquinone copolymer
(o) 4-hydroxybenzoic acid/terephthalic acid/2,6-naphthalene dicarboxylic acid/hydroquinone/4,4'-dihydroxybiphenyl copolymer
(p) 4-hydroxybenzoic acid/terephthalic acid/4-aminophenol copolymer
(q) 2-hydroxy-6-naphthoic acid/terephthalic acid/4-aminophenol copolymer
(r) 4-hydroxybenzoic acid/2-hydroxy-6-naphthoic acid/terephthalic acid/4-aminophenol copolymer
(s) 4-hydroxybenzoic acid/terephthalic acid/4,4'-dihydroxybiphenyl/4-aminophenol copolymer
(t) 4-hydroxybenzoic acid/terephthalic acid/ethylene glycol copolymer
(u) 4-hydroxybenzoic acid/terephthalic acid/4,4'-dihydroxybiphenyl/ethylene glycol copolymer
(v) 4-hydroxybenzoic acid/2-hydroxy-6-naphthoic acid/terephthalic acid/ethylene glycol copolymer
(w) 4-hydroxybenzoic acid/2-hydroxy-6-naphthoic acid/terephthalic acid/4,4'-dihydroxybiphenyl/ethylene glycol copolymer
(x) 4-hydroxybenzoic acid/terephthalic acid/2,6-naphthalene dicarboxylic acid/4,4'-dihydroxybiphenyl copolymer Among the aforementioned examples, (b) and (c) are preferable, and (c) is more preferable. In other words, it is more preferable that $Ar^1$ is a 1,4-phenylene group, $Ar^2$ is a 1,4-phenylene group and a 1,3-phenylene group, $Ar^3$ is a biphenylylene group, and X and Y are both oxygen atoms.

The repeating unit (1) content in the liquid crystal polyester resin, relative to the total amount of all repeating units constituting the liquid crystal polyester resin, is preferably at least 30 mol %, more preferably at least 30 mol % and at most 80 mol %, even more preferably at least 30 mol % and at most 70 mol %, and particularly preferably at least 35 mol % and at most 65 mol %. The total amount of all repeating units constituting the liquid crystal polyester resin is a value obtained by dividing the masses of the respective repeating units constituting the liquid crystal polyester resin by the formula weights of those repeating units to determine the substance-quantity equivalent amounts (moles) of the repeating units, and taking the sum thereof.

If the repeating unit (1) content in the liquid crystal polyester resin is at least 30 mol %, then the heat resistance and hardness of the molded bodies obtained by the liquid crystal polyester resin composition of the present embodiment can be easily improved. Additionally, if the repeating unit (1) content is not more than 80 mol %, then the melt viscosity can be made lower. For this reason, the temperature necessary for molding the liquid crystal polyester resin easily becomes lower.

The repeating unit (2) content in the liquid crystal polyester resin, relative to the total amount of all repeating units constituting the liquid crystal polyester resin, is preferably at most 35 mol %, more preferably at least 10 mol % and at most 35 mol %, even more preferably at least 15 mol % and at most 35 mol %, and particularly preferably at least 17.5 mol % and at most 32.5 mol %.

The repeating unit (3) content in the liquid crystal polyester resin, relative to the total amount of all repeating units constituting the liquid crystal polyester resin, is preferably at most 35 mol %, more preferably at least 10 mol % and at most 35 mol %, even more preferably at least 15 mol % and at most 35 mol %, and particularly preferably at least 17.5 mol % and at most 32.5 mol %.

In one aspect, the total amount of the repeating units (1), (2) and (3) in the liquid crystal polyester resin does not exceed 100 mol %.

In the liquid crystal polyester resin, the ratio between the repeating unit (2) content and the repeating unit (3) content, represented by [repeating unit (2) content]/[repeating unit (3) content] (mol %/mol %) (sometimes referred to as molar ratio (2)/(3)), is preferably at least 0.9 and at most 1.1, more preferably at least 0.95 and at most 1.05, and even more preferably at least 0.98 and at most 1.02.

In the liquid crystal polyester resin, the ratio between the repeating unit (3) content and the repeating unit (1) content, represented by [repeating unit (3) content]/[repeating unit (1) content] (mol %/mol %) (sometimes referred to as molar ratio (3)/(1)), is preferably at least 0.2 and at most 1.0, more preferably at least 0.25 and at most 0.85, and even more preferably at least 0.3 and at most 0.75.

In the liquid crystal polyester resin, the molar ratio y/x in the repeating units (2) should preferably be greater than zero and at most 1, more preferably at least 0.1 and at most 0.9, and even more preferably at least 0.2 and at most 0.8.

x represents the molar content of repeating units in which $Ar^2$ is a 1,4-phenylene group.

y represents the molar content of repeating units in which $Ar^2$ is a 1,3-phenylene group.

The aforementioned liquid crystal polyester resin may have just one type, or may have two or more types of the repeating units (1) to (3), independently of each other. Additionally, the liquid crystal polyester resin may have one type, or two or more types of repeating units other than the repeating units (1) to (3), but the content thereof is preferably at least 0 mol % and at most 10 mol %, more preferably at least 0 mol % and at most 5 mol %, relative to the total amount of all repeating units.

Liquid Crystal Polyester Resin Mixture

In the present embodiment, it is also possible to use a liquid crystal polyester resin mixture in which multiple types of liquid crystal polyester resins are mixed. As a result thereof, the melt flowability of the liquid crystal polyester resin composition of the present embodiment can be made better and warping of the resulting molded body can be well suppressed.

In this case, it is assumed that the liquid crystal polyester resin mixture is a mixture of liquid crystal polyester resins having mutually different flow starting temperatures. In the liquid crystal polyester resin mixture, the liquid crystal polyester resin having the higher flow starting temperature will be referred to as the first liquid crystal polyester resin and that having the lower flow starting temperature will be referred to as the second liquid crystal polyester resin.

In one aspect, the liquid crystal polyester resin according to the present embodiment may be a liquid crystal polyester resin mixture.

In another aspect, the liquid crystal polyester resin according to the present embodiment may contain a first liquid crystal polyester resin and a second liquid crystal polyester resin, such that the flow starting temperature of the first liquid crystal polyester resin is higher than the flow starting temperature of the second liquid crystal polyester resin.

The flow starting temperature of the above-mentioned first liquid crystal polyester resin is preferably at least 300° C., more preferably at least 310° C., and even more preferably at least 315° C. Additionally, the flow starting temperature of the above-mentioned first liquid crystal polyester resin is preferably at most 400° C., more preferably at most 360° C. and even more preferably at most 345° C. The above-mentioned upper limit values and lower limit values may be arbitrarily combined.

In one aspect, the flow starting temperature of the above-mentioned first liquid crystal polyester resin is preferably at least 300° C. and at most 400° C., more preferably at least 310° C. and at most 360° C., and even more preferably at least 315° C. and at most 345° C.

If the flow starting temperature of the above-mentioned first liquid crystal polyester resin is within the above-mentioned range, then it tends to be possible to achieve both melt flowability in the resin and heat resistance in the molded body that is obtained.

On the other hand, the flow starting temperature of the above-mentioned second liquid crystal polyester resin is preferably at least 260° C., more preferably at least 270° C., and even more preferably at least 285° C. Additionally, the flow starting temperature of the above-mentioned second liquid crystal polyester resin is preferably at most 350° C., more preferably at most 320° C., and even more preferably at most 315° C. The above-mentioned upper limit values and lower limit values may be arbitrarily combined.

In one aspect, the flow starting temperature of the above-mentioned second liquid crystal polyester resin is preferably at least 260° C. and at most 350° C., more preferably at least 270° C. and at most 315° C., and even more preferably at least 285° C. and at most 315° C.

If the flow starting temperature of the above-mentioned second liquid crystal polyester resin is within the above-mentioned range, then it becomes easier to obtain good flowability in thin portions of molds (i.e., thin-area flowability) and the load deflection temperature of the molded body that is obtained tends to be sufficiently high.

Additionally, in the liquid crystal polyester resin mixture, the amount of the above-mentioned second liquid crystal polyester resin that is contained, relative to 100 parts by mass of the above-mentioned first liquid crystal polyester resin, is preferably 100 to 150 parts by mass, more preferably 30 to 120 parts by mass, and even more preferably 50 to 100 parts by mass.

The above-mentioned second liquid crystal polyester resin content relative to the above-mentioned first liquid crystal polyester resin may be appropriately set so that a desired state of balance is reached between the load deflection temperature and the thin-area flowability of the liquid crystal polyester resin mixture.

The liquid crystal polyester resin mixture may contain a liquid crystal polyester resin other than the first liquid crystal polyester resin and the second liquid crystal polyester resin. In that case, in the resin mixture, the resin having the highest flow starting temperature should be defined as the first liquid crystal polyester resin and the resin having the lowest flow starting temperature should be defined as the second liquid crystal polyester resin.

A liquid crystal polyester resin mixture in which the total amount of the first liquid crystal polyester resin and the second liquid crystal polyester resin relative to the total mass of the liquid crystal polyester resin mixture is at least 80% by mass and at most 100% by mass is preferable.

In the liquid crystal polyester resin mixture, $\alpha/\beta$ is preferably within the range from at least 0.1 to at most 0.6, more preferably within the range from at least 0.3 to at most 0.6.

$\alpha$ represents the molar ratio y/x in the first liquid crystal polyester resin.

$\beta$ represents the molar ratio y'/x' in the second liquid crystal polyester resin.

x represents the molar content of the repeating units, in the first liquid crystal polyester resin, in which $Ar^2$ is a 1,4-phenylene group.

y represents the molar content of the repeating units, in the first liquid crystal polyester resin, in which $Ar^2$ is a 1,3-phenylene group.

x' represents the molar content of the repeating units, in the second liquid crystal polyester resin, in which $Ar^2$ is a 1,4-phenylene group.

y' represents the molar content of the repeating units, in the second liquid crystal polyester resin, in which $Ar^2$ is a 1,3-phenylene group.

Method for Producing Liquid Crystal Polyester Resin

Next, an example of the method for producing the liquid crystal polyester resin according to the present embodiment will be explained.

The liquid crystal polyester resin of the present embodiment is preferably produced by means of the acylation step and the polymerization step indicated below.

The acylation step is a step for obtaining an acylate by acylating a phenolic hydroxy group in a raw material monomer by means of a fatty acid anhydride (for example, acetic anhydride or the like).

In the polymerization step, a liquid crystal polyester resin may be obtained by polymerizing acyl groups in the acylate obtained by the acylation step with carboxy groups in acylates of an aromatic dicarboxylic acid and an aromatic hydroxycarboxylic acid so as to induce transesterification.

The acylation step and the polymerization step may be performed in the presence of a heterocyclic organic base compound (sometimes referred to as an imidazole derivative) as represented below.

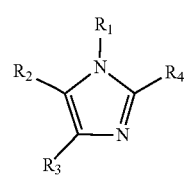

(5)

In the above-mentioned formula (5), $R_1$ to $R_4$, each independently, represent a hydrogen atom, an alkyl group having 1 to 4 carbon atoms, a hydroxymethyl group, a cyano group, a cyanoalkyl group in which the alkyl group has 1 to 4 carbon atoms, a cyanoalkoxy group in which the alkoxy group has 1 to 4 carbon atoms, a carboxy group, an amino group, an aminoalkyl group having 1 to 4 carbon atoms, an aminoalkoxy group having 1 to 4 carbon atoms, a phenyl group, a benzyl group, a phenylpropyl group or a formyl group.

The heterocyclic organic base compound in the above formula (5) is preferably an imidazole derivative in which RI is an alkyl group having 1 to 4 carbon atoms, and $R_2$ to $R_4$ are respectively hydrogen atoms.

As a result thereof, the reactivity of the acylation reaction during the acylation step and the transesterification reaction during the polymerization step can be raised. Additionally, the color of the molded body obtained by using the liquid crystal polyester resin composition of the present embodiment can be made better.

Among heterocyclic organic base compounds, one or both of 1-methyl imidazole and 1-ethyl imidazole are particularly preferred for being easily available.

Additionally, the amount of the heterocyclic organic base compound that is used, when the total amount of the raw material monomers (i.e., aromatic dicarboxylic acids, aromatic diols and aromatic hydroxycarboxylic acids) in the liquid crystal polyester resin is defined as 100 parts by mass, should preferably be 0.005 to 1 part by mass. Additionally, for the purposes of the color and productivity of the molded bodies, it is more preferable for the amount to be 0.05 to 0.5 parts by mass relative to 100 parts by mass of the raw material monomers.

The heterocyclic organic base compound only needs to exist temporarily during the acylation reaction and the transesterification reaction, and the time of addition thereof may be immediately before the acylation reaction starts, during the acylation reaction, or between the acylation reaction and the transesterification reaction. The liquid crystal polyester resin obtained in this way has extremely high melt flowability and excellent thermal stability.

The amount of the fatty acid anhydride (for example, acetic anhydride or the like) that is used should be decided by considering the amount of the aromatic diols and aromatic hydroxycarboxylic acids, which are the raw material monomers, that are used. Specifically, the amount of the fatty acid anhydride that is used, relative to the total amount of the phenolic hydroxy groups contained in the raw material monomers, is preferably at least 1.0 times and at most 1.2 times the equivalent amount, more preferably at least 1.0 times and at most 1.15 times the equivalent amount, even more preferably at least 1.03 times and at most 1.12 times the equivalent amount, and particularly preferably at least 1.05 times and at most 1.1 times the equivalent amount.

If the amount of the fatty acid anhydride that is used relative to the total amount of the phenolic hydroxy groups contained in the raw material monomer is at least 1.0 times the equivalent amount, then the acylation reaction progresses easily, unreacted raw material monomers do not tend to remain in the later polymerization step, and as a result, the polymerization proceeds efficiently. Additionally, when the acylation reaction proceeds sufficiently in this way, the raw material monomer that has not been acylated is sublimated, and there is less of a possibility that a fractionator that is used at the time of polymerization will be blocked. However, if the amount of the fatty acid anhydride that is used is not more than 1.2 times the equivalent amount, then the liquid crystal polyester resin that is obtained cannot be easily colored.

The acylation reaction in the above-mentioned acylation step is preferably performed for 30 minutes to 20 hours at a temperature range from 130° C. to 180° C., more preferably for 1 to 5 hours at a temperature from 140° C. to 160° C.

The aromatic dicarboxylic acids used in the above-mentioned polymerization step may be made to be present in the reaction system during the acylation step. In other words, during the acylation step, the aromatic diols, the aromatic hydroxycarboxylic acids and the aromatic dicarboxylic acids may be made to be present in the same reaction system. This is because the carboxy groups and optionally substitutable substituent groups in the aromatic dicarboxylic acids are all unaffected by fatty acid anhydrides.

Therefore, it is possible to use a method in which the acylation step and the polymerization step are sequentially performed after loading an aromatic diol, an aromatic hydroxycarboxylic acid and an aromatic dicarboxylic acid into a reactor, or it is possible to use a method in which an aromatic diol and an aromatic dicarboxylic acid are loaded into a reactor and the acylation step is performed, and thereafter, the aromatic dicarboxylic acid is further loaded into the reactor and the polymerization step is performed. For the purpose of making the production step more convenient, the former method is preferable.

The transesterification reaction in the above-mentioned polymerization step is preferably performed while raising the temperature from 130° C. to 400° C. at a temperature increase rate of 0.1 to 50° C./min, and more preferably performed while raising the temperature from 150° C. to 350° C. at a temperature increase rate of 0.3 to 5° C./min.

Additionally, when performing the transesterification reaction in the polymerization step, it is preferable to evaporate and distill, out of the system, fatty acids (for example, acetic acid and the like) that are generated as byproducts and unreacted fatty acid anhydrides (for example, acetic anhydride and the like), in order to shift the equilibrium. At this time, by refluxing some of the distilled fatty acids back to the reactor, it is possible to condense or desublimate and return, to the reactor, raw material monomers and the like that have been evaporated or sublimated together with the fatty acids.

In the acylation reaction during the acylation step and the transesterification reaction during the polymerization step, it is possible to use a batch device or a continuous device as the reactor. No matter which type of reaction device is used, it is possible to obtain a liquid crystal polyester resin that can be used in the present embodiment.

After the above-mentioned polymerization step, a step for increasing the molecular weight of the liquid crystal polyester resin obtained by this polymerization step may be performed. For example, it is possible to increase the molecular weight of the liquid crystal polyester resin by cooling and thereafter grinding the liquid crystal polyester resin obtained in the polymerization step to obtain a powdered liquid crystal polyester resin, then further heating these powders.

Additionally, the molecular weight of the liquid crystal polyester resin may be increased by pelletizing the powdered liquid crystal polyester resin obtained by cooling and grinding, thereby producing a pelletized liquid crystal polyester resin, and thereafter heating this pelletized liquid crystal polyester resin. The molecular weight increase using these methods is known as solid-phase polymerization in the aforementioned technical field.

Solid-phase polymerization is particularly effective as a method for increasing the molecular weight of the liquid crystal polyester resin.

By increasing the molecular weight of the liquid crystal polyester resin, it becomes easy to obtain a liquid crystal polyester resin having a favorable flow starting temperature, as mentioned below.

As the reaction conditions for the solid-phase polymerization, a method of heat-treating a resin in the solid state for 1 to 20 hours in an inert gas atmosphere or under reduced pressure is usually employed. The polymerization conditions associated with this solid-phase polymerization can be appropriately optimized after determining the flow starting temperature of the resin obtained by melt polymerization. Examples of devices used for the heat treatment include known dryers, reactors, inert ovens and electric furnaces.

The flow starting temperature of the liquid crystal polyester resin is preferably at least 270° C., more preferably 270 to 400° C., and even more preferably 280 to 380° C. By using a liquid crystal polyester resin having a flow starting temperature in this range, the heat resistance of a molded body obtained by using the liquid crystal polyester resin composition in the present embodiment can be made better. Additionally, the thermal stability of the liquid crystal polyester resin can be improved and thermal degradation can be avoided during the melting and molding when obtaining the molded body from the liquid crystal polyester resin composition.

The flow starting temperature, also known as the flow temperature or the fluidity temperature, is the temperature at which, using a capillary rheometer, a viscosity of 4,800 Pa·s (48,000 poise) is exhibited when the liquid crystal polyester is melted and extruded from a nozzle having an inner diameter of 1 mm and a length of 10 mm, while raising the temperature at a rate of 4° C./min with a load of 9.8 MPa. The flow starting temperature serves as an indicator of the molecular weight of the liquid crystal polyester (see "Liquid Crystal Polymers—Synthesis, Molding, and Applications—" edited by Naoyuki Koide, pp. 95-105, CMC Publishing Co., Ltd., published Jun. 5, 1987).

A liquid crystal polyester resin having the above-mentioned favorable flow starting temperature can be easily obtained by appropriately optimizing the repeating units constituting the liquid crystal polyester resin. In other words, when the linearity of molecular chains in the liquid crystal polyester resin is raised, the flow starting temperature thereof tends to become higher.

For example, repeating units derived from terephthalic acid increase the linearity of liquid crystal polyester resin molecular chains. On the other hand, repeating units derived from isophthalic acid increase the curvature (lower the linearity) of liquid crystal polyester resin molecular chains. For this reason, it is possible to obtain a liquid crystal polyester resin having a desired flow starting temperature by controlling the copolymerization ratio between terephthalic acid and isophthalic acid.

When using the above-mentioned liquid crystal polyester resin mixture, it is preferable for at least one type of liquid crystal polyester resin to be a polymer obtained by polymerizing raw material monomers containing an aromatic hydroxycarboxylic acid in the presence of an imidazole compound. Liquid crystal polyester resins obtained in this way have extremely high flowability when melted and also have excellent thermal stability.

Additionally, in the liquid crystal polyester resin according to the present embodiment, it is preferable to optimize the copolymerization ratio between terephthalic acid and isophthalic acid. In this way, it is possible to control the linearity of the molecular chains in the liquid crystal polyester resin as mentioned above. As a result thereof, it is possible to produce each of multiple types of liquid crystal polyester resins having flow starting temperatures that are different from each other.

Glass Component

The glass components included in the liquid crystal polyester resin composition of the present embodiment contain glass fibers having a length of more than 50 μm and glass fine powders (hereinafter sometimes referred to simply as "fine powders") having a length of at least 4 μm and at most 50 μm.

In one aspect, the glass components may further contain glass ultrafine powders (hereinafter sometimes referred to simply as "ultrafine powders") having a length of less than 4 μm.

The length of the glass components included in the liquid crystal polyester resin composition of the present embodiment is the major axis of circumscribed rectangle of the glass components in binarized scanning electron microscope (SEM) images. The major axis of circumscribed rectangle refers to the length of a long side when a glass component particle is surrounded by a circumscribed rectangle. The method for analyzing the glass components using a SEM will be explained below.

In one aspect, the glass fibers are glass component particles for which the major axis of circumscribed rectangle in the above-mentioned SEM images is more than 50 μm, fine powders are glass component particles for which the major axis of circumscribed rectangle in the above-mentioned SEM images is at least 4 μm and at most 50 μm, and ultrafine powders are glass component particles for which the major axis of circumscribed rectangle in the above-mentioned SEM images is less than 4 μm.

Glass Fiber

The number-average fiber length of the glass fibers contained in the liquid crystal polyester resin composition of the present embodiment is at last 200 μm and at most 400 μm.

If the number-average fiber length of the glass fibers is at least 200 μm, then the mechanical strength of molded bodies using virgin material can be made sufficiently higher. Additionally, if the number-average fiber length of the glass fibers in the present embodiment is not more than 400 μm, then the glass fibers tend not to be physically destroyed when reground. As a result thereof, mechanical strength decreases caused by the physical destruction of the glass fibers can be suppressed. Therefore, the mechanical strength retention rate when reground can be made sufficiently high.

The number-average fiber length of the above-mentioned glass fibers is preferably at least 210 μm, more preferably at least 220 μm, and even more preferably at least 230 μm. Additionally, the number-average fiber length of the above-mentioned glass fibers is preferably at most 380 μm, and more preferably at most 350 μm.

In one aspect, the number-average fiber length of the above-mentioned glass fibers is preferably at least 210 μm and at most 380 μm, more preferably at least 220 μm and at most 350 μm, even more preferably at least 230 μm and at most 350 μm, and may be at least 234 μm and at most 314 μm.

The glass fibers contained in the liquid crystal polyester resin composition in the present embodiment preferably have a substantially circular cross-sectional shape in the radial direction. It is possible to confirm, by SEM, whether the above-mentioned glass fibers have a substantially circular cross-sectional shape in the radial direction. The diameter of the above-mentioned glass fibers is preferably at least 5

μm and at most 17 μm, more preferably at least 6 μm and at most 15 μm, and even more preferably at least 9 μm and at most 12 μm.

The diameter of the glass fibers can be determined by means of a glass fiber diameter measurement method to be explained below.

Fine Powder

The fine powder contained in the liquid crystal polyester resin composition in the present embodiment preferably has a substantially circular cross-sectional shape in the radial direction. In the present description, the radial direction of the fine powders is the direction of the minor axis of circumscribed rectangle of fine powder particles in binarized SEM images. The minor axis of circumscribed rectangle refers to the length of a short side when a particle is surrounded by a circumscribed rectangle. It is possible to confirm, by SEM, whether the above-mentioned fine powders have a substantially circular cross-sectional shape in the radial direction. The diameter of the above-mentioned fine power is preferably at least 5 μm and at most 17 μm, more preferably at least 6 μm and at most 15 μm, and even more preferably at least 9 μm and at most 12 μm.

The diameter of the above-mentioned fine powders can be determined by means of the measurement method described in <Measurement 2 of Glass Components in Liquid Crystal Polyester Resin Composition> below.

The aspect ratio (length/diameter) of the fine powders contained in the liquid crystal polyester resin composition of the present embodiment is preferably at least 0.3 and more preferably at least 0.5. Additionally, the aspect ratio of the fine powders is preferably at most 5.6 and more preferably at most 5.3.

In one aspect, the aspect ratio (length/diameter) of the fine powders contained in the liquid crystal polyester resin composition of the present embodiment is preferably at least 0.3 and at most 5.6.

The fine powders contained in the liquid crystal polyester resin composition of the present embodiment are composed of first fine powders having a length of at least 4 μm and at most 40 μm (hereinafter sometimes referred to simply as "first fine powders"), and second fine powders having a length of more than 40 μm and at most 50 μm (hereinafter sometimes referred to simply as "second fine powders").

In one aspect, the fine powders according to the present embodiment are composed of first fine powders that are glass components having a major axis of circumscribed rectangle of at least 4 μm and at most 40 μm in the above-mentioned SEM images, and second fine powders that is glass components having a major axis of circumscribed rectangle of more than 40 μm and at most 50 μm in the above-mentioned SEM images.

Content Ratio

The liquid crystal polyester resin composition in the present embodiment contains at least 5 parts by mass and at most 100 parts by mass of the glass components relative to 100 parts by mass of the liquid crystal polyester. If the glass component content is at least 5 parts by mass and at most 100 parts by mass, it is possible to obtain both moldability of the liquid crystal polyester resin composition and mechanical strength in the molded body.

The liquid crystal polyester resin composition preferably contains at least 10 parts by mass and at most 70 parts by mass, and more preferably at least 20 parts by mass and at most 60 parts by mass of the glass components relative to 100 parts by mass of the liquid crystal polyester.

In another aspect, the liquid crystal polyester resin composition may contain at least 29 parts by mass and at most 43 parts by mass of the glass components relative to 100 parts by mass of the liquid crystal polyester.

In one aspect, the glass component content in the liquid crystal polyester resin composition of the present embodiment is preferably 5 to 30% by mass relative to the total mass of the liquid crystal polyester resin composition.

The liquid crystal polyester resin content in the liquid crystal polyester resin composition of the present embodiment is preferably 60 to 90% by mass relative to the total mass of the liquid crystal polyester resin composition.

The liquid crystal polyester resin composition of the present embodiment contains at least 20% and at most 95% of the fine powders relative to the total number of the glass components.

If the content of the fine powders relative to the total number of the glass components in the liquid crystal polyester resin composition of the present embodiment is at least 20%, then the influence of the physical destruction of the glass components when reground can be reduced. Therefore, the mechanical strength retention rate when reground can be made sufficiently high.

In the liquid crystal polyester resin composition of the present embodiment, the content of the fine powders relative to the total number of the glass components is preferably at least 50% and more preferably at least 70%.

Additionally, in the liquid crystal polyester resin composition of the present embodiment, if the content of the fine powders relative to the total number of the glass components is not more than 95%, then the mechanical strength of molded bodies composed of virgin material can be made sufficiently high.

In the liquid crystal polyester resin composition of the present embodiment, the content of the fine powders relative to the total number of the glass components is preferably at most 90%.

In one aspect, the content of the fine powders relative to the total number of the glass components is preferably at least 50% and at most 90%, and particularly preferably at least 70% and at most 90%.

In another aspect, the content of the fine powders relative to the total number of the glass components is preferably at least 73% and at most 88%

The liquid crystal polyester resin composition of the present embodiment preferably contains at least 40% and less than 90% of the first fine powders relative to the total number of the glass components.

In another aspect, the content of the first fine powders may be at least 69% and at most 85% relative to the total number of the glass components.

If the content of the first fine powders relative to the total number of the glass components is at least 40%, then the influence of the physical destruction of the glass components when reground can be reduced. Therefore, the mechanical strength retention rate when reground can be made sufficiently high.

Additionally, if the content of the first fine powders relative to the total number of the glass components is less than 90%, then the mechanical strength of molded bodies composed of virgin material can be made sufficiently high.

Therefore, if the content of the first fine powders relative to the total number of the glass components is at least 40% and less than 90%, then the mechanical strength retention rate when reground can be made higher.

In the liquid crystal polyester resin composition of the present embodiment, the upper limit value and the lower limit value of the content of the first fine powders may be combined, within the possible range, with the upper limit value and the lower limit value of the content of the fine powders.

In one aspect, the content of the first fine powders in the above-mentioned glass components does not exceed the content of the above-mentioned fine powders in the glass components.

In one aspect, the content of the second fine powders in the liquid crystal polyester resin composition of the present embodiment is preferably at least 40% and less than 90% relative to the total number of the glass components.

Glass Component Analysis Method

The method for measuring the length of the glass components will be explained. First, 5 g of pellets comprising the liquid crystal polyester resin composition of the present embodiment are heated in a muffle furnace (manufactured by Yamato Scientific Co., Ltd., "FP410") at 600° C. for 4 hours in an air atmosphere, thereby removing the resin and obtaining incinerated residues containing the glass components. An amount of the incinerated sample, weighing 0.3 g, is loaded into 50 mL of purified water, and a 0.5 vol % aqueous solution of micro-90 (manufactured by Sigma-Aldrich Japan) is added as a surfactant in order to improve the dispersion properties, thereby obtaining a mixed solution. The mixed solution that is obtained is subjected to ultrasonic waves for 5 minutes to uniformly disperse the incinerated sample in the purified water, thereby obtaining a sample solution.

Next, this sample solution in which the glass components are dispersed in purified water is transferred to a 5 mL sample cup by means of a pipette and diluted 5 times with purified water, thereby obtaining a sample solution. Using a particle shape image analysis device ("PITA3" manufactured by Seishin Enterprise Co., Ltd.) under the conditions indicated below, the obtained sample solution is passed through a flow cell and images of the glass component particles moving through the fluid are captured one at a time. In the above-mentioned measurement method, the time at which the number of glass component particles accumulated from the measurement starting time reaches 5000 is defined as the measurement ending time.

Conditions

Number of measurements: 5000
Dispersion solvent: water
Dispersion conditions: 0.5 vol % aqueous solution of micro-90 as carrier solution 1 and carrier solution 2
Sample solution speed: 2.08 µL/s
Carrier solution 1 speed: 333.33 µL/s
Carrier solution 2 speed: 333.33 µL/s
Observation magnification: objective, 10×

The obtained images are binarized, the major axis of circumscribed rectangle of the glass component particles are measured in the processed images and defined as the lengths of the glass component particles.

As the number-average fiber length of the glass fibers in the present embodiment, the average value of the measured values (major axis of circumscribed rectangle) is employed for the glass fibers having a length greater than 50 µm in the above-mentioned processed images.

The content of the fine powders relative to the total number of the glass components in the present embodiment can be calculated by dividing the number of particles of the fine powders having a length of at least 4 µm and at most 50 µm by the total number (for example, 5000) of the glass component particles in the above-mentioned processed images.

The content of the first fine powders relative to the total number of the glass components in the present embodiment can be calculated by dividing the number of particles of the first fine powders having a length of at least 4 µm and at most 40 µm by the total number (for example, 5000) of the glass component particles in the above-mentioned processed images.

The content of the second fine powders relative to the total number of the glass components in the present embodiment can be calculated by dividing the number of particles of the second fine powders having a length (major axis of circumscribed rectangle) of more than 40 µm and at most 50 µm by the total number (for example, 5000) of the glass component particles in the above-mentioned processed images.

The method for measuring the diameter of the glass fibers in the present embodiment will be explained. As the diameter of the glass fibers in the present embodiment, incinerated residues containing the above-mentioned glass components are observed by a SEM at 1000-times magnification, the diameters (i.e., the minor axis of circumscribed rectangle) of 100 glass fibers randomly selected from the SEM images are respectively measured, and the average value of the 100 measured values is employed.

The method for measuring the diameter of the fine powders in the present embodiment will be explained. First, incinerated residues containing the above-mentioned glass components are observed by a SEM at 1000-times magnification. The obtained images are binarized, and in the processed images, the radial lengths (i.e., the minor axis of circumscribed rectangle) of 100 particles of the fine powders randomly selected from the processed images are measured, and the average value of the 100 measured values is taken as the diameter of the fine powders.

The aspect ratio of the fine powders in the present embodiment can be calculated, in the images obtained with the above-mentioned particle shape image analysis device, by defining the directions substantially aligned with the diameters of the particles of the fine powders measured in the above-mentioned method as the radial directions of the fine powder particles, and calculating length/diameter for these fine powder particles.

Glass Component Preparation Method

The number-average fiber length of the glass fibers contained in the liquid crystal polyester resin composition can be adjusted by adjusting the melt-kneading conditions when producing the liquid crystal polyester resin composition. For example, in order to make the number-average fiber length of the glass fibers contained in the liquid crystal polyester resin composition smaller, it is effective to use means such as raising the rotation speed of a screw that is used, lowering the cylinder temperature, increasing the melt viscosity of the melted resin, or increasing the shearing force.

The fine powders contained in the liquid crystal polyester resin composition of the present embodiment may be produced by grinding a commercially available fibrous glass filler (hereinafter sometimes referred to as "base fibers"). In the present embodiment, the fine powders may be blended into the liquid crystal polyester resin so that the content of the fine powders relative to the total number of the glass components contained in the liquid crystal polyester resin composition is within the range from at least 20% to at most 95%. Additionally, in the method for producing the liquid crystal polyester resin composition to be explained below, the content of the fine powders may be controlled so as to be within the range from at least 20% to at most 95% relative to the total number of the glass components by appropriately modifying the production conditions.

The base fibers according to the present embodiment are not particularly limited, but examples include fillers produced by various methods, such as long-fiber type chopped glass fibers, short-fiber type milled glass fibers and the like. Among these, the above-mentioned base fibers are preferably chopped glass fibers. The above-mentioned base fibers may be a single type used alone, or may be a combination of two or more types.

Examples of the types of the above-mentioned base fibers include E-glass, A-glass, C-glass, D-glass, AR-glass, R-glass, S-glass or mixtures thereof. Among these, E-glass is preferable for having excellent strength and being easily available.

As the above-mentioned base fibers, weakly alkaline fibers have excellent mechanical strength (tensile strength and Izod impact strength) and can be favorably used. In particular, glass fibers in which the silicon oxide content is at least 50% by mass and at most 80% by mass relative to the total mass of the above-mentioned glass fibers are preferably used, and glass fibers in which the silicon oxide content is at least 65% by mass and at most 77% by mass are more preferably used.

The above-mentioned base fibers may be fibers that have been treated, as needed, with a coupling agent such as a silane-based coupling agent or a titanium-based coupling agent.

The above-mentioned base fibers may be coated with a thermoplastic resin such as a urethane resin, an acrylic resin, an ethylene/vinyl acetate copolymer or the like, or with a heat-curable resin such as an epoxy resin. Additionally, the above-mentioned base fibers may be processed with a sizing agent.

The number-average fiber length of the base fibers is preferably at least 20 μm and at most 6000 μm.

If the number-average fiber length of the base fibers is at least 20 μm, then the reinforcement effect of the obtained molded bodies is sufficiently high. Additionally, if the number-average fiber length of the base fibers is not more than 6000 μm, then the number-average fiber length of the glass fibers contained in the liquid crystal polyester resin composition after melt-kneading can be easily adjusted to be not more than 400 μm.

The number-average fiber length of the base fibers provided for melt-kneading is more preferably at least 1000 μm and even more preferably at least 2000 μm. The number-average fiber length of the base fibers is more preferably at most 5000 μm, and even more preferably at most 4500 μm.

In one aspect, the number-average fiber length of the base fibers provided for melt-kneading is more preferably at least 1000 μm and at most 5000 μm, and even more preferably at least 2000 μkm and at most 4500 μm.

The fiber diameter (also referred to as the single-fiber diameter) of the base fibers provided for melt-kneading is preferably at least 5 μm and at most 17 μm. If the fiber diameter of the base fibers is at least 5 μm, then the reinforcement effect on the obtained molded bodies is sufficiently high. Additionally, if the fiber diameter of the base fibers is not more than 17 μm, then the melt flowability of the liquid crystal polyester resin composition is sufficiently high.

The fiber diameter of the base fibers provided for melt-kneading is more preferably at least 6 μm, and even more preferably at least 9 μm. Additionally, the fiber diameter of the base fibers is more preferably at most 15 μm, and even more preferably at most 12 μm.

In one aspect, the fiber diameter of the base fibers provided for melt-kneading is preferably at least 6 μm and at most 15 μm, and even more preferably at least 9 μm and at most 12 μm.

The fiber diameter of the base fibers remains substantially unchanged even after melt-kneading.

Method for Measuring Number-Average Fiber Length and Fiber Diameter of Base Fibers The "number-average fiber length of the base fibers" in the present description, where not particularly noted, refers to a value measured by the method described in JIS R3420 "7.8 Length of Chopped Strands".

Additionally, the "fiber diameter of the base fibers" in the present description, where not particularly noted, refers to a value measured by "method A" among the methods described in JIS R3420 "7.6 Single-Fiber Diameter".

Other Components

The liquid crystal polyester resin composition may contain at least one type of another component such as a filler other than the glass components in the present embodiment, an additive, a resin other than the liquid crystal polyester resin or the like, within a range such that the effects of the present invention are obtained.

In one aspect, the amount of the other components contained in the liquid crystal polyester resin composition in the present embodiment is preferably 5 to 40% by mass relative to the total mass of the liquid crystal polyester resin composition.

The filler other than the glass components in the embodiment may be a fibrous filler or may be a flake-shaped filler, and other than fibrous and flake-shaped, may be a spherical or other particulate filler. Additionally, the filler may be an inorganic filler or may be an organic filler.

Examples of fibrous fillers that are inorganic fillers include carbon fibers such as PAN-based carbon fibers and pitch-based carbon fibers; ceramic fibers such as silica fibers, alumina fibers and silica-alumina fibers; and metallic fibers such as stainless steel fibers. Additional examples include whiskers such as potassium titanate whiskers, barium titanate whiskers, wollastonite whiskers, aluminum borate whiskers, silicon nitride whiskers and silicon carbide whiskers.

Examples of fibrous fillers that are organic fillers include polyester fibers, aramid fibers and cellulose fibers.

Examples of flake-shaped fillers that are inorganic fillers include talc, mica, graphite, wollastonite, glass flakes, barium sulfate and calcium carbonate. Mica may be muscovite, phlogopite, fluorophlogopite or tetrasilicic mica.

Examples of particulate fillers that are inorganic fillers include silica, alumina, titanium oxide, glass beads, glass balloons, boron nitride, silicon carbide and calcium carbonate.

Examples of additives include additives that are usually used in resin compositions. Examples of such additives include stabilizers, UV absorbers, plasticizers, flame retardants, flame retardant promoters, anti-static agents, surfactants, colorants, lubricants, mold release agents and the like.

Examples of stabilizers include hindered phenols, hydroquinone, phosphites, substitutions thereof and the like.

Examples of UV absorbers include resorcinol, salicylate, benzotriazole, benzophenone and the like.

Examples of colorants include materials containing dyes such as nitrosine, and pigments such as cadmium sulfide, phthalocyanine, carbon black and the like.

Examples of lubricants include stearic acid, montanic acid, esters thereof, half-esters thereof with polyhydric alcohols, stearyl alcohol, stearamide, polyethylene waxes and the like.

The moldability of the liquid crystal polyester resin composition of the present embodiment can be improved by further adding a mold release agent. Examples of the mold release agent include montanic acid, salts thereof, esters thereof, half-esters thereof with polyhydric alcohols, stearyl alcohol, stearamide, polyethylene waxes and the like, and preferably, fatty acid esters of pentaerythritol.

The blended amount of the mold release agent is preferably at least 0.1 parts by mass and at most 0.5 parts by mass, more preferably at least 0.2 parts by mass and at most 0.4 parts by mass, relative to 100 parts by mass of the liquid crystal polyester resin. If the blended amount of the mold release agent is at least 0.1 parts by mass and at most 0.5 parts by mass, then there is a tendency for contamination of the mold being used, swelling of the molded body or the like to be less likely to occur, and mold release effects are more easily obtained.

Examples of resins other than the liquid crystal polyester include thermoplastic resins other than liquid crystal polyester, such as polypropylenes, polyamides, polyesters other than liquid crystal polyesters, polysulfones, polyethersulfones, polyphenylene sulfides, polyetherketones, polycarbonates, polyphenylene ethers and polyetherimides; and heat-curable resins such as phenol resins, epoxy resins, polyimide resins, cyanate resins and the like. The amount of resins other than liquid crystal polyester that is contained is usually 0 to 20 parts by mass relative to 100 parts by mass of the liquid crystal polyester.

Method for Producing Liquid Crystal Polyester Resin Composition

The liquid crystal polyester resin composition is preferably prepared by melt-kneading the liquid crystal polyester resin, the glass components and optionally other components, by means of an extruder, and extruding the mixture in pellet form.

The glass components that are used may be prepared in advance so that the content of the fine powders will be within the range from at least 20% to at most 95% relative to the total number of the glass components. Additionally, it is possible to use a commercially available fibrous glass filler as a raw material, and to implement control so that this fibrous filler is broken during the production of the liquid crystal polyester resin composition, thereby causing the content of the fine powders relative to the total number of the glass components contained in the liquid crystal polyester resin composition to be within the range from at least 20% to at most 95%.

The extruder preferably has a cylinder, at least one screw provided in the cylinder, and at least one supply port provided in the cylinder. Furthermore, it is more preferable for at least one vent portion to be provided in the cylinder.

Furthermore, in the present embodiment, an extremely large amount of energy is required to break the fine powders having a length of at least 4 μm and at most 50 μm. Thus, it is known that the fine powders are less likely to undergo physical destruction than glass fibers are. Therefore, in a reground material to which the liquid crystal polyester resin composition of the present embodiment is applied, it can be expected that the fine powders will not change even when melted inside a screw during injection molding.

According to the liquid crystal polyester resin composition having a configuration as indicated above, a liquid crystal polyester resin composition having a high mechanical strength retention rate when reground is obtained.

Molded Body

The molded body in the present embodiment has the above-mentioned liquid crystal polyester resin composition as the forming material.

As the molding method of the liquid crystal polyester resin composition of the present embodiment, a melt molding method is preferred. Examples thereof include injection molding methods; extrusion molding methods such as T-die methods and inflation methods; compression molding methods; blow molding methods; vacuum molding methods; and press molding methods. Among these, injection molding methods are preferred.

Examples of products and components that are molded bodies formed from the liquid crystal polyester resin composition include: bobbins such as optical pickup bobbins and transformer bobbins; relay components such as relay cases, relay bases, relay sprues and relay armatures; connectors such as RTMM connectors, DDR connectors, CPU sockets, S/O connectors, DIMM connectors, board-to-board connectors, FPC connectors and card connectors; reflectors such as lamp reflectors and LED reflectors; holders such as lamp holders and heater holders; diaphragms such as speaker diaphragms; separation claws such as separation claws for copiers and separation claws for printers; camera module components; switch components; motor components; sensor components; hard disk drive components; tableware such as ovenware; vehicle components; aircraft components; and sealing members such as semiconductor element sealing members and coil sealing members.

Additionally, examples other than the above include copying machine/printer-related components such as separation claws and heater holders; mechanical components such as impellers, fan gears, gears, bearings, motor components and cases; automotive/vehicle-related components such as automotive machinery components, various fuel-related, exhaust and intake pipes, various exhaust-gas, coolant and oil temperature sensors, air conditioner thermostat bases, air conditioner motor insulators, radiator motor brush holders, wiper motor-related components, distributors, starter switches, starter relays, transmission wire harnesses, air conditioner panel switch substrates, fuel-related solenoid valve coils, fuse connectors, ECU connectors, horn terminals, electrical component insulation plates, lamp sockets, lamp reflectors, lamp housings, brake pistons, solenoid bobbins, engine oil filters and ignition device cases; cooking equipment such as microwave cooking pans and heat-resistant tableware; construction materials or civil engineering materials including thermal insulation or soundproofing materials such as flooring materials and wall materials, support materials such as beams and columns, and roofing materials; aircraft, spacecraft and space instrument components; radiation installation elements for nuclear reactors and the like; marine installation elements; cleaning instruments; optical instrument components; valves; pipes; nozzles; filters; membranes; medical instrument components and medical materials; sensor components; sanitary supplies; sports equipment; leisure equipment and the like.

Molded Body Mechanical Strength Evaluation Method

The mechanical strength of the molded body is evaluated by measuring the tensile strength and the Izod impact strength.

The tensile strength of the molded body is measured in accordance with the ASTM D638 standard using an ASTM No. 4 test piece produced by an injection molder using the liquid crystal polyester resin composition.

The Izod impact strength of the molded body is measured in accordance with the ASTM D256 standard using a test piece obtained by halving, in the length direction, a test piece having a length of 127 mm, a width of 12.7 mm and a thickness of 6.4 mm, produced by an injection molder using the liquid crystal polyester resin composition.

With a molded body having a structure as mentioned above, the above-mentioned liquid crystal polyester resin composition is used and thus, a molded body having a high mechanical strength retention rate when reground is obtained.

In one aspect, the liquid crystal polyester resin composition of the present embodiment is a liquid crystal polyester resin that:

comprises a liquid crystal polyester resin, glass components, and optionally other components;

the liquid crystal polyester resin is a liquid crystal polyester containing repeating units derived from 4-hydroxybenzoic acid, repeating units derived from 4,4'-dihydroxybiphenyl, repeating units derived from terephthalic acid, and repeating units derived from isophthalic acid;

the glass components include glass fibers having a length of more than 50 μm and glass fine powders having a length of at least 4 μm and at most 50 μm;

the fine powders are composed of first fine powders having a length of at least 4 μm and at most 40 μm, and second fine powders having a length of more than 40 μm and at most 50 μm;

the number-average fiber length of the glass fibers is at least 200 μm and at most 400 μm, preferably at least 210 μm and at most 380 μm, more preferably at least 220 μm and at most 350 μm, even more preferably at least 230 μm and at most 350 μm, and particularly preferably at least 234 μm and at most 314 μm;

the diameter of the fine powders is preferably at least 5 μm and at most 17 μm, more preferably at least 6 μin and at most 15 μm, and even more preferably at least 9 μm and at most 12 μm;

the liquid crystal polyester resin content relative to the total amount of the liquid crystal polyester resin composition is 60 to 90% by mass;

the glass component content, relative to 100 parts by mass of the liquid crystal polyester resin, is at least 5 parts by mass and at most 100 parts by mass, preferably at least 10 parts by mass and at most 70 parts by mass, more preferably at least 20 parts by mass and at most 60 parts by mass, and particularly preferably at least 29 parts by mass and at most 43 parts by mass;

the content of the fine powders, relative to the total number of the glass components, is at least 20% and at most 95%, preferably at least 50% and at most 90%, more preferably at least 70% and at most 90%, and may be at least 73% and at most 88%; and the content of the first fine powders is at least 40% and less than 90%, and may be at least 69% and at most 85% relative to the total number of the glass components.

In another aspect, the liquid crystal polyester resin composition of the present embodiment is a liquid crystal polyester resin composition wherein:

when the Izod impact strength retention rate is determined under the conditions described in the examples below, the Izod impact strength retention rate is at least 90%; and when the tensile strength retention rate is determined under the conditions described in the examples below, the tensile strength retention rate is at least 90%.

EXAMPLES

Hereinafter, examples of the present invention will be explained. However, the present invention is not limited to these examples. The measurements were performed as indicated below.

Flow Starting Temperature of Liquid Crystal Polyester Resin

Using a flow tester ("Model CFT-500EX" from Shimadzu Corp.), 2 g of liquid crystal polyester were loaded into a cylinder equipped with a die having a nozzle with an inner diameter of 1 mm and a length of 10 mm, the liquid crystal polyester was melted and extruded from the nozzle with a load of 9.8 MPa while raising the temperature at a rate of 4° C./min, and the temperature at which a viscosity of 4800 Pa·s (48000 poise) was exhibited was measured.

Measurement 1 of Glass Components in Liquid Crystal Polyester Resin Composition

First, 5 g of pellets comprising the liquid crystal polyester resin composition of the present example were heated in a muffle furnace (manufactured by Yamato Scientific Co., Ltd., "FP410") at 600° C. for 4 hours in an air atmosphere, thereby removing the resin and obtaining incinerated residues containing the glass components. An amount of the incinerated sample, weighing 0.3 g, was loaded into 50 mL of purified water, and a 0.5 vol % aqueous solution of micro-90 (manufactured by Sigma-Aldrich Japan) was added as a surfactant in order to improve the dispersion properties, thereby obtaining a mixture. The obtained mixture was subjected to ultrasonic waves for 5 minutes to uniformly disperse the incinerated sample in the purified water, thereby obtaining a sample solution.

Next, this sample solution in which the glass components were dispersed was transferred to a 5 mL sample cup by means of a pipette and diluted 5 times with purified water, thereby obtaining a sample solution. Using a particle shape image analysis device ("PITA-3" manufactured by Seishin Enterprise Co., Ltd.) under the conditions described below, the obtained sample solution was passed through a flow cell and images of the glass component particles moving through the fluid were captured one at a time.

Conditions

Number of measurements: 5000
Dispersion solvent: water

Dispersion conditions: 0.5 vol % aqueous solution of micro-90 as carrier solution 1 and carrier solution 2
Sample solution speed: 2.08 μL/s
Carrier solution 1 speed: 333.33 μL/s
Canier solution 2 speed: 333.33 μL/s
Observation magnification: 10× objective Length of Glass Component The length of each glass component particle was determined by binarizing the obtained images and measuring the major axis of circumscribed rectangle of the glass component particles in the processed images.

Content of Fine Powders Relative to Total Number of Glass Components

The amount of the fine powders relative to the total number of the glass components was calculated by dividing the number of particles of the fine powders having a length of at least 4 μm and at most 50 μm by the total number (i.e., 5000 in the above example) of glass component particles in the above-mentioned processed images.

Content of First Fine Powders Relative to Total Number of Glass Components

The content of the first fine powders relative to the total number of the glass components was calculated by dividing the number of particles of the first fine powders having a length of at least 4 μm and at most 40 μm by the total number (i.e., 5000 in the above example) of glass component particles in the above-mentioned processed images.

Measurement 2 of Glass Components in Liquid Crystal Polyester Resin Composition

Diameter of Fine Powder

The incinerated residues obtained in the above-described <Measurement 1> were observed at 1000-times magnification using a SEM ("S-4700" from Hitachi, Ltd.). The obtained images were binarized, the radial lengths (i.e., the minor axis of circumscribed rectangle) of 100 fine powder particles randomly selected from the processed images were measured, and the average value of the 100 measured values was taken as the fine powder diameter.

Number-Average Fiber Length of Glass Fibers Having Length More than 50 μm

The number-average fiber lengths of the glass fibers were calculated using the measured value of glass fibers having a length of more than 30 μm in the above-mentioned processed images.

(A) Production of Liquid Crystal Polyester Resin

Production Example 1 (Liquid Crystal Polyester Resin (A-1))

A reactor equipped with a stirring device, a torque meter, a nitrogen gas feeding pipe, a thermometer and a reflux cooler was loaded with 994.5 g (7.2 moles) of 4-hydroxybenzoic acid, 446.9 g (2.4 moles) of 4,4'-dihydroxybiphenyl, 299.0 g (1.8 moles) of terephthalic acid, 99.7 g (0.6 moles) of isophthalic acid and 1347.6 g (13.2 moles) of acetic anhydride, 0.2 g of 1-methylimidazole were added as a catalyst and the atmosphere inside the reactor was well-substituted with nitrogen gas.

Thereafter, while stirring the mixture in a nitrogen gas flow, the temperature was raised from room temperature to 150° C. over 30 minutes and the mixture was refluxed for 30 minutes while maintaining the same temperature.

Next, 2.4 g of 1-methylimidazole were added. Thereafter, while distilling away acetic acid byproducts and unreacted acetic anhydride, the temperature was raised from 150° C. to 320° C. over 2 hours and 50 minutes, and held at 320° C. for 30 minutes. After holding the temperature, the contents were extracted and cooled to room temperature.

The obtained solids were ground to a particle size of 0.1 to 1 mm in a grinder, after which solid phase polymerization was performed, in a nitrogen atmosphere, by raising the temperature from room temperature to 250° C. over 1 hour, raising the temperature from 250° C. to 296° C. over 5 hours, and holding the temperature at 296° C. for 3 hours. After the solid phase polymerization, cooling was performed, thereby obtaining a powdered liquid crystal polyester resin (A-1). The flow starting temperature of the obtained liquid crystal polyester resin (A-1) was 328° C.

Production Example 2 (Liquid Crystal Polyester Resin (A-2))

A reactor equipped with a stirring device, a torque meter, a nitrogen gas feeding pipe, a thermometer and a reflux cooler was loaded with 994.5 g (7.2 moles) of 4-hydroxybenzoic acid, 446.9 g (2.4 moles) of 4,4'-dihydroxybiphenyl, 239.2 g (1.44 moles) of terephthalic acid, 159.5 g (0.96 moles) of isophthalic acid and 1347.6 g (13.2 moles) of acetic anhydride, 0.2 g of 1-methylimidazole were added as a catalyst and the atmosphere inside the reactor was well-substituted with nitrogen gas.

Thereafter, while stirring the mixture in a nitrogen gas flow, the temperature was raised from room temperature to 150° C. over 30 minutes and the mixture was refluxed for 1 hour while maintaining the same temperature.

Next, 0.9 g of 1-methylimidazole were added, and while distilling away acetic acid byproducts and unreacted acetic anhydride, the temperature was raised from 150° C. to 320° C. over 2 hours and 50 minutes, and held at 320° C. for 30 minutes. After holding the temperature, the contents were extracted and cooled to room temperature.

The obtained solids were ground to a particle size of 0.1 to 1 mm in a grinder, and solid phase polymerization was performed, in a nitrogen atmosphere, by raising the temperature from room temperature to 220° C. over 1 hour, raising the temperature from 220° C. to 241° C. over 0.5 hours, and holding the temperature at 241° C. for 10 hours. After the solid phase polymerization, cooling was performed, thereby obtaining a powdered liquid crystal polyester resin (A-2). The flow starting temperature of the obtained liquid crystal polyester resin (A-2) was 292° C.

Additionally, in the examples below, the commercially available products indicated below were used as the glass components. However, the number-average fiber lengths indicated below are nominal values from the manufacturers, and the values do not take fine powders into account. The shapes described for each filler represent the shapes of radial cross sections of the respective fillers.

Filler A: CS3J260S (manufactured by Nitto Boseki Co., Ltd., substantially circular, diameter 10 μm, number-average fiber length 3 mm)

Filler B: PF20E-001 (manufactured by Nitto Boseki Co., Ltd., substantially circular, diameter 10 μm, number-average fiber length 20 μm)

Additionally, the raw material indicated below was used in the examples below. Mold release agent: Loxiol VPG861 (manufactured by Emery Oleochemicals Japan Ltd., mixture of full ester (tetrastearate) and partial ester of pentaerythritol and stearic acid, 5% mass reduction temperature 310° C.)

Production of Liquid Crystal Polyester Resin Composition (Virgin Material)

Examples 1 to 4 and Comparative Examples 1 to 3

Glass components were prepared in advance by mixing glass fibers having a length of more than 50 μm, fine powders and ultrafine powders. A liquid crystal polyester resin, the glass components and a mold release agent were melt-kneaded, at the ratios indicated in Table 1 and Table 2, using a twin-screw extruder (manufactured by Ikegai Corp., "PCM-30HS") with a cylinder temperature of 340° C., to obtain a pellet-shaped liquid crystal polyester resin composition. The liquid crystal polyester resin composition was produced using a water-sealed vacuum pump (manufactured by Shinko Seiki Co., Ltd., "SW-25"), while deaerating through vacuum vents provided in the twin-screw extruder. In the evaluations below, this material is referred to as virgin material and the physical values of the virgin material were taken as the initial physical values.

Comparative Example 4

An attempt was made to produce a liquid crystal polyester resin composition in a manner similar to that in Comparative Example 1, except that 122 parts by mass of the glass components were blended relative to 100 parts by mass of the liquid crystal polyester resin. However, the viscosity rose too high during melt-kneading and strands could not be produced.

Production of Reground Material

Runners and sprues generated when producing the testing pieces mentioned below using the pellet-shaped liquid crystal polyester resin compositions in Examples 1 to 4 and Comparative Examples 1 to 3 were ground by means of a granulator (manufactured by Harmo Co., Ltd., "SPCII 750H") to obtain a reground material. In the evaluation below, the physical values of this reground material were taken as the post-regrinding physical values.

After hot-air drying the virgin materials and the reground materials of Examples 1 to 4 and Comparative Examples 1 to 3 at 130° C. for 4 hours, the materials were evaluated by the methods indicated below. The results are indicated in Table 3 and Table 4.

Mechanical Strength Retention Rate

The mechanical strength retention rates of molded bodies formed from the liquid crystal polyester resin compositions were evaluated by determining the tensile strength retention rates and the Izod impact strength retention rates.

Tensile Strength

The tensile strengths of the liquid crystal polyester resin compositions were measured in accordance with the ASTM D638 standard, using ASTM No. 4 test pieces that were produced by using an injection molder (manufactured by Nissei Plastic Industrial Co., Ltd., "PNX40-5A") under molding conditions such that the molding temperature was 350° C., the mold temperature was 130° C. and the injection rate was 75 mm/s.

The tensile strengths of the virgin materials and the reground materials were respectively determined, and the results obtained by calculating the tensile strengths of the reground materials relative to the tensile strengths of the virgin materials were taken as the tensile strength retention rates.

Izod Impact Strength

Measurements were made in accordance with the ASTM D256 standard, using test pieces that were obtained by using an injection molder (manufactured by Nissei Plastic Industrial Co., Ltd., "PNX40-5A"), under molding conditions such that the molding temperature was 350° C., the mold temperature was 130° C. and the injection rate was 75 mm/s, to produce test pieces having a length of 127 mm, a width of 12.7 mm and a thickness of 6.4 mm, then halving the test pieces in the length direction.

The Izod impact strengths of the virgin materials and the reground materials were respectively determined, and the results obtained by calculating the Izod impact strengths of the reground materials relative to the Izod impact strengths of the virgin materials were taken as the Izod impact strength retention rates.

From the results for the tensile strength retention rates and the Izod impact strength retention rates, the mechanical strength retention rates of the molded bodies formed from the liquid crystal polyester resin compositions were evaluated according to the criteria indicated below.

A: Tensile strength retention rate at least 90% and Izod impact strength retention rate at least 90%

B: The above-mentioned conditions in "A" not satisfied

Heat Resistance

The heat resistances of the liquid crystal polyester resin compositions were evaluated by determining the load deflection temperature retention rates.

Load Deflection Temperature

Measurements were made in accordance with the ASTM D648 standard, with a load of 1.82 MPa and a heat increase rate of 2° C./min , using test pieces that were produced by using an injection molder (manufactured by Nissei Plastic Industrial Co., Ltd., "PNX40-5A"), under molding conditions such that the molding temperature was 350° C., the mold temperature was 130° C. and the injection rate was 75 mm/s, to produce test pieces having a length of 127 mm, a width of 12.7 mm and a thickness of 6.4 mm The load deflection temperatures of the virgin materials and the reground materials were respectively determined, and the results obtained by calculating the load deflection temperatures of the reground materials relative to the load deflection temperatures of the virgin materials were taken as the load deflection temperature retention rates.

TABLE 1

|  | Ex. 1 | Ex. 2 | Ex. 3 | Ex. 4 |
| --- | --- | --- | --- | --- |
| Liquid crystal polyester resin (A-1) [parts by mass] | 55 | 55 | 55 | 55 |
| Liquid crystal polyester resin (A-2) [parts by mass] | 45 | 45 | 45 | 45 |
| Glass Component   Filler A [parts by mass] | 22.6 | 25 | 21.4 | 17.9 |
| Filler B [parts by mass] | 6.5 | 17.9 | 21.4 | 25 |
| Mold release agent [parts by mass] | 0.3 | 0.3 | 0.3 | 0.3 |
| Content [%] of first fine powder | 69.8 | 74.2 | 83.4 | 84.7 |
| Content [%] of second fine powder | 3.4 | 3.3 | 0.5 | 3.2 |
| Content [%] of fine powder | 73.2 | 77.5 | 83.9 | 88.0 |
| Diameter [μm] of fine powder | 11.5 | 11.4 | 10.7 | 11.5 |
| Number-average fiber length [μm] of glass fibers | 280 | 234 | 252 | 314 |

TABLE 2

|  | Comp. Ex. 1 | Comp. Ex. 2 | Comp. Ex. 3 | Comp. Ex. 4 |
| --- | --- | --- | --- | --- |
| Liquid crystal polyester resin (A-1) [parts by mass] | 55 | 55 | 55 | 55 |
| Liquid crystal polyester resin (A-2) [parts by mass] | 45 | 45 | 45 | 45 |
| Glass Component   Filler A [parts by mass] | 42.9 | 6.5 | — | 122 |
| Filler B [parts by mass] | — | 22.6 | 42.9 | — |
| Mold release agent [parts by mass] | 0.3 | 0.3 | 0.3 | 0.3 |
| Content [%] of first fine powder | 12.7 | 97.3 | 93.0 | — |
| Content [%] of second fine powder | 0.9 | 1.2 | 3.5 | — |
| Content [%] of fine powder | 13.7 | 98.5 | 96.5 | — |
| Diameter [μm] of fine powder | 11.1 | 11.6 | 11.1 | — |
| Number-average fiber length [μm] of glass fibers | 299 | 238 | 104 | — |

TABLE 3

|  |  | Ex. 1 | Ex. 2 | Ex. 3 | Ex. 4 |
| --- | --- | --- | --- | --- | --- |
| Tensile strength [MPa] | virgin material | 131 | 129 | 122 | 120 |
|  | reground material | 133 | 130 | 121 | 119 |
|  | retention rate [%] | 101.5 | 100.8 | 99.2 | 99.2 |
| Izod impact strength [J/m] | virgin material | 450 | 454 | 441 | 416 |
|  | reground material | 443 | 444 | 423 | 398 |
|  | retention rate [%] | 98.4 | 97.8 | 95.9 | 95.7 |
| Mechanical strength evaluation |  | A | A | A | A |
| Load deflection temperature [° C.] | virgin material | 259 | 260 | 258 | 259 |
|  | reground material | 260 | 259 | 258 | 259 |
|  | retention rate [%] | 100.4 | 99.6 | 100 | 100 |

TABLE 4

|  |  | Comp. Ex. 1 | Comp. Ex. 2 | Comp. Ex. 3 | Comp. Ex. 4 |
| --- | --- | --- | --- | --- | --- |
| Tensile strength [MPa] | virgin material | 128 | 121 | 105 | — |
|  | reground material | 120 | 115 | 92 | — |
|  | retention rate [%] | 93.8 | 95.0 | 87.6 | — |
| Izod impact strength [J/m] | virgin material | 354 | 441 | 704 | — |
|  | reground material | 310 | 379 | 505 | — |
|  | retention rate [%] | 87.6 | 85.9 | 71.7 | — |
| Mechanical strength evaluation |  | B | B | B | mold failed |
| Load deflection temperature [° C.] | virgin material | 257 | 250 | 221 | — |
|  | reground material | 252 | 245 | 219 | — |
|  | retention rate [%] | 98.1 | 98.0 | 99.1 | — |

As indicated in Table 3, the liquid crystal polyester resin compositions of Examples 1 to 4, in which the present invention was applied, had high mechanical strength retention rates.

This can be considered to be due to the number-average fiber lengths of the glass fibers having been within the range from at least 200 μm to 400 μm, thus making the glass fibers less susceptible to physical destruction. As a result thereof, decreases in mechanical strength caused by the physical destruction of the glass fibers can be considered to have been suppressed.

Additionally, it can be considered that the influence of the physical destruction of the glass components when reground was able to be reduced because the content of the fine powders relative to the total number of the glass components contained in the liquid crystal polyester resin composition was within the range from at least 20% to at most 95%.

For the above reasons, the liquid crystal polyester resin compositions in Examples 1 to 4 can be considered to have been able to raise the mechanical strength retention rate when reground.

Additionally, the liquid crystal polyester resin compositions of Examples 1 to 4 also had high load deflection temperature retention rates. In view thereof, the liquid crystal polyester resin compositions in Examples 1 to 4 can be considered to have excellent heat resistance when reground.

On the other hand, the liquid crystal polyester resin compositions of Comparative Examples 1 to 3 indicated in Table 4 had high load deflection temperature retention rates like those in Examples 1 to 4. Thus, they can be considered to have excellent heat resistance when reground. However, the liquid crystal polyester resin compositions in Comparative Examples 1 to 3 had low mechanical strength retention rates.

From the above results, it was confirmed that the present invention is useful.

INDUSTRIAL APPLICABILITY

The present invention is able to provide a liquid crystal polyester resin composition and a molded body having a high mechanical strength retention rate when reground, and is thus extremely useful for industrial purposes.

The invention claimed is:

1. A liquid crystal polyester resin composition comprising:
    100 parts by mass of a liquid crystal polyester resin; and
    at least 5 parts by mass and at most 100 parts by mass of glass components; wherein
    the glass components contain glass fibers having a length of more than 50 μm and glass fine powders having a length of at least 4 μm and at most 50 μm;
    the number-average fiber length of the glass fibers is at least 200 μm and at most 400 μm; and
    the content of the fine powders is at least 20% and at most 95% relative to a total number of the glass components.

2. The liquid crystal polyester resin composition according to claim 1, wherein:
    the fine powders are composed of first fine powders having a length of at least 4 μm and at most 40 μm, and second fine powders having a length of more than 40 μm and at most 50 μm; and
    the content of the first fine powders is at least 40% and less than 90% relative to the total number of the glass components.

3. The liquid crystal polyester resin composition according to claim 1, wherein the content of the fine powders is at least 70% and at most 90% relative to the total number of the glass components.

4. The liquid crystal polyester resin composition according to claim 1, wherein the liquid crystal polyester resin contains repeating units represented by formulas (1) to (3) below:

$$—O—Ar^1—CO— \quad (1)$$

$$—CO—Ar^2—CO— \quad (2)$$

$$—X—Ar^3—Y— \quad (3)$$

wherein
- $Ar^1$ represents a phenylene group, a naphthylene group or a biphenylylene group;
- $Ar^2$ and $Ar^3$ represent, independently of each other, a phenylene group, a naphthylene group, a biphenylylene group or a group represented by formula (4) below;
- X and Y represent, independently of each other, an oxygen atom or an imino group (—NH—); and
- at least one hydrogen atom in the group represented by $Ar^1$, $Ar^2$ or $Ar^3$ may, each independently, be substituted by a halogen atom, an alkyl group having 1 to 10 carbon atoms or an aryl group having 6 to 20 carbon atoms;

$$—Ar^4—Z—Ar^5— \quad (4)$$

wherein
- $Ar^4$ and $Ar^5$ represent, independently of each other, a phenylene group or a naphthylene group; Z represents an oxygen atom, a sulfur atom, a carbonyl group, a sulfonyl group or an alkylidene group having 1 to 10 carbon atoms; and
- at least one hydrogen atom in the group represented by $Ar^4$ or $Ar^5$ may, each independently, be substituted by a halogen atom, an alkyl group having 1 to 10 carbon atoms or an aryl group having 6 to 20 carbon atoms.

5. The liquid crystal polyester resin composition according to claim 4, wherein $A^1$ is a 1,4-phenylene group, $Ar^2$ is a 1,4-phenylene group and a 1,3-phenylene group, $Ar^3$ is a biphenylylene group, and X and Y are each oxygen atoms.

6. The liquid crystal polyester resin composition according to claim 4, wherein:
- a molar ratio (3)/(1) between repeating units represented by formula (1) and repeating units represented by formula (3) is at least 0.2 and at most 1.0; and
- a molar ratio (2)/(3) between repeating units represented by formula (3) and repeating units represented by formula (2) is at least 0.9 and at most 1.1.

7. The liquid crystal polyester resin composition according to claim 4, wherein a molar ratio y/x between repeating units represented by formula (2) is greater than 0 and at most 1, wherein:
- x represents a molar content of repeating units in which $Ar^2$ is a 1,4-phenylene group; and
- y represents a molar content of repeating units in which $Ar^2$ is a 1,3-phenylene group.

8. The liquid crystal polyester resin composition according to claim 7, wherein the liquid crystal polyester resin contains a first liquid crystal polyester resin and a second liquid crystal polyester resin, and $\alpha/\beta$ is at least 0.1 and at most 0.6, wherein:
- $\alpha$ represents the molar ratio y/x in the first liquid crystal polyester resin; and
- $\beta$ represents the molar ratio y/x in the second liquid crystal polyester resin.

9. A molded body formed from the liquid crystal polyester resin composition according to claim 1.